(12) United States Patent
Hammer

(10) Patent No.: US 6,901,880 B2
(45) Date of Patent: Jun. 7, 2005

(54) PET FOOD FEEDER

(76) Inventor: Markus Hammer, Memelsh. 27, 89231 Neu-Ulm (DE)

( * ) Notice: Subject to any disclaimer, the term of this patent is extended or adjusted under 35 U.S.C. 154(b) by 33 days.

(21) Appl. No.: 10/674,346

(22) Filed: Oct. 1, 2003

(65) Prior Publication Data

US 2005/0072366 A1    Apr. 7, 2005

(51) Int. Cl.[7] ............................................. A01K 5/01
(52) U.S. Cl. .................................. 119/61.57; 119/61.4
(58) Field of Search ............................ 119/51.5, 61.4, 119/61.5, 61.57, 72; 248/140, 312.1, 318

(56) References Cited

U.S. PATENT DOCUMENTS

| | | | |
|---|---|---|---|
| 2,514,491 A | * | 7/1950 | Hay et al. .................... 119/475 |
| 3,661,121 A | * | 5/1972 | Zielin ....................... 119/61.57 |
| 4,256,175 A | * | 3/1981 | Strickland .................... 165/67 |
| 5,467,733 A | * | 11/1995 | Messina ...................... 119/464 |
| 5,501,176 A | * | 3/1996 | Tully ........................ 119/61.57 |

\* cited by examiner

Primary Examiner—Robert P. Swiatek
(74) Attorney, Agent, or Firm—Troxell Law Office, PLLC

(57) ABSTRACT

A pet food feeder, comprising a connecting member coupled to a support rod, a first connecting surface vertically disposed on the connecting member, a second connecting surface vertically disposed on a containing member of a food bin, a pivotal axis and an axial hole respectively disposed on the first and second connecting surfaces respectively, such that the entire pet food feeder passing through the pivotal axis and the axial hole to combine the containing member and the support rod, and a positioning latch on the second connecting surface being extended into a fixing hole on the first connecting surface to fix an angle of elevation for the opening of the food bin. The positioning latch can be extended into other fixing hole to adjust the angle of elevation of the opening of the food bin to collect the food towards the utmost bottom of the food bin and facilitate the feeding of pets.

11 Claims, 9 Drawing Sheets

PET FOOD FEEDER

BACKGROUND OF THE INVENTION

1. Field of the Invention

The present invention relates to a pet food feeder, more particularly to a pet food feeder comprising a connecting member coupled to a support rod, a first connecting surface vertically disposed on the connecting member, a second connecting surface vertically disposed on a containing member of a food bin, a pivotal axis and an axial hole respectively disposed on the first and second connecting surfaces respectively, such that the entire pet food feeder passing through the pivotal axis and the axial hole to combine the containing member and the support rod, and a positioning latch on the second connecting surface being extended into a fixing hole on the first connecting surface to fix an angle of elevation for the opening of the food bin. The positioning latch can be extended into other fixing hole to adjust the angle of elevation of the opening of the food bin to collect the food towards the utmost bottom of the food bin and facilitate the feeding of pets.

2. Description of the Related Art

In general, most people having pets before can have lots of fun to their life brought by the companionship of the pets, and even can establish a friendship between the pet owner and the pet, and the loyalty given by the pet. Thus, pet owners treat their pets as family members, and take very good care of them.

Since a pet owner usually provides a place for the pet to live and also needs to pay attention to the pet food and avoid abnormal feeding habit that may affect the growth of the pets or even jeopardize the health and cause death to the pet. Therefore, many pet owners will control the number, schedule, and quantity of supplying pet food according to the size of the pet. More particularly, the pet food is contained in a fixed pet food feeder to assure the sanitation of the food, and maintain a fixed location for feeding the pet and train the pet with the feeding habit.

The common pet food feeders sold in the market generally base on the volume of the container for the design, and the container is usually a bin placed on the ground, and the bottom of the bin is parallel to the floor. Therefore, the pet can only use its mouth or noise to push food to the edge of the bin to centralize the food before eating. Such arrangement not only affects the normal feeding of the pet, but the food in the bin may be spread all over the place that makes the environment dirty.

SUMMARY OF THE INVENTION

The primary objective of the present invention is to provide a pet food feeder, comprising a connecting member coupled to a support rod, a first connecting surface vertically disposed on the connecting member, a second connecting surface vertically disposed on a containing member of a food bin, a pivotal axis and an axial hole respectively disposed on the first and second connecting surfaces respectively, such that the entire pet food feeder passing through the pivotal axis and the axial hole to combine the containing member and the support rod, and a positioning latch on the second connecting surface being extended into a fixing hole on the first connecting surface to fix an angle of elevation for the opening of the food bin. The positioning latch can be extended into other fixing hole to adjust the angle of elevation of the opening of the food bin to collect the food towards the utmost bottom of the food bin and facilitate the feeding of pets.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 2:
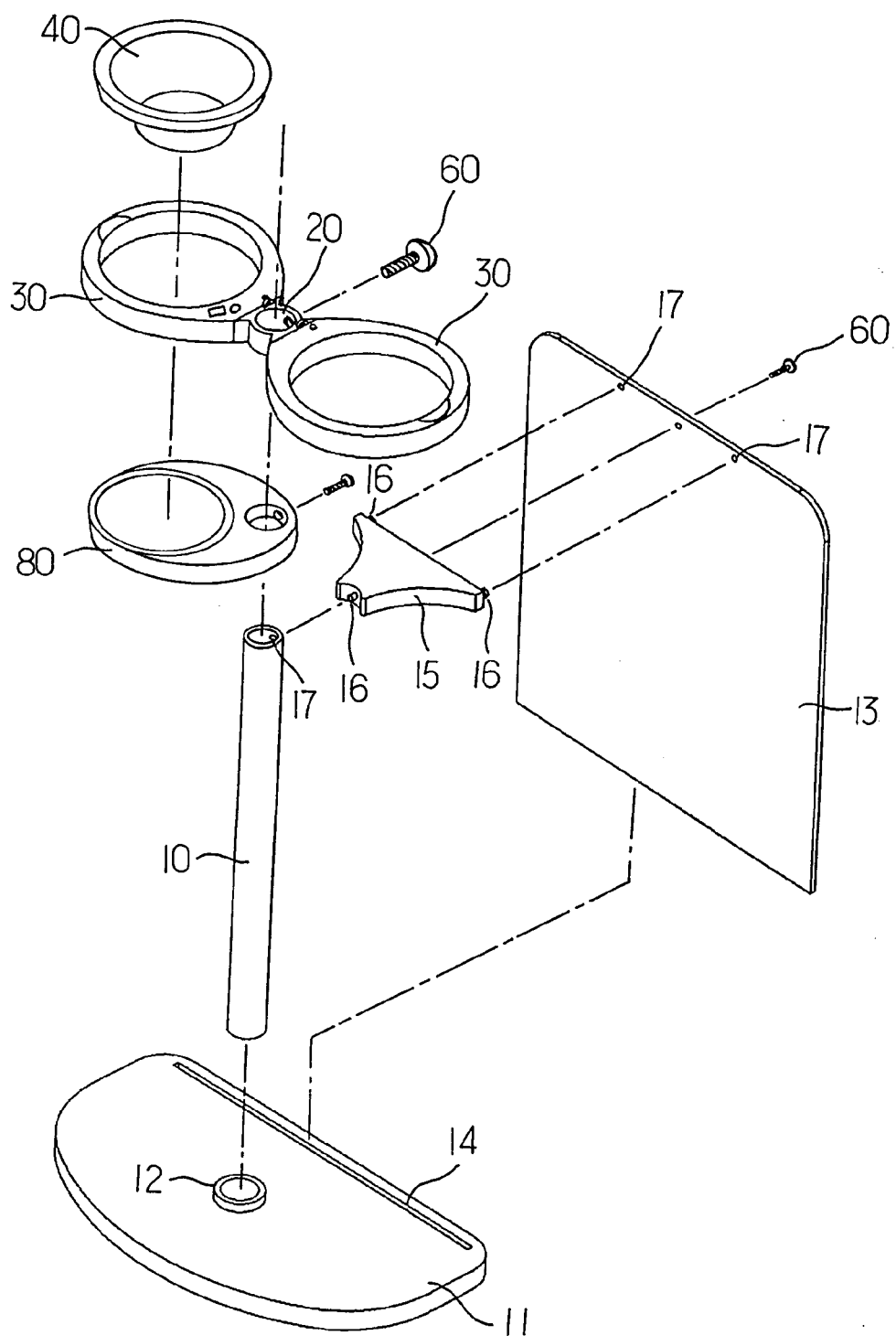
FIG. 2 is a perspective diagram of the disassembled parts of the structure between the support rod and bottom plate, and the structure between the joint member and the bottom panel according to the present invention.
Figure 3:
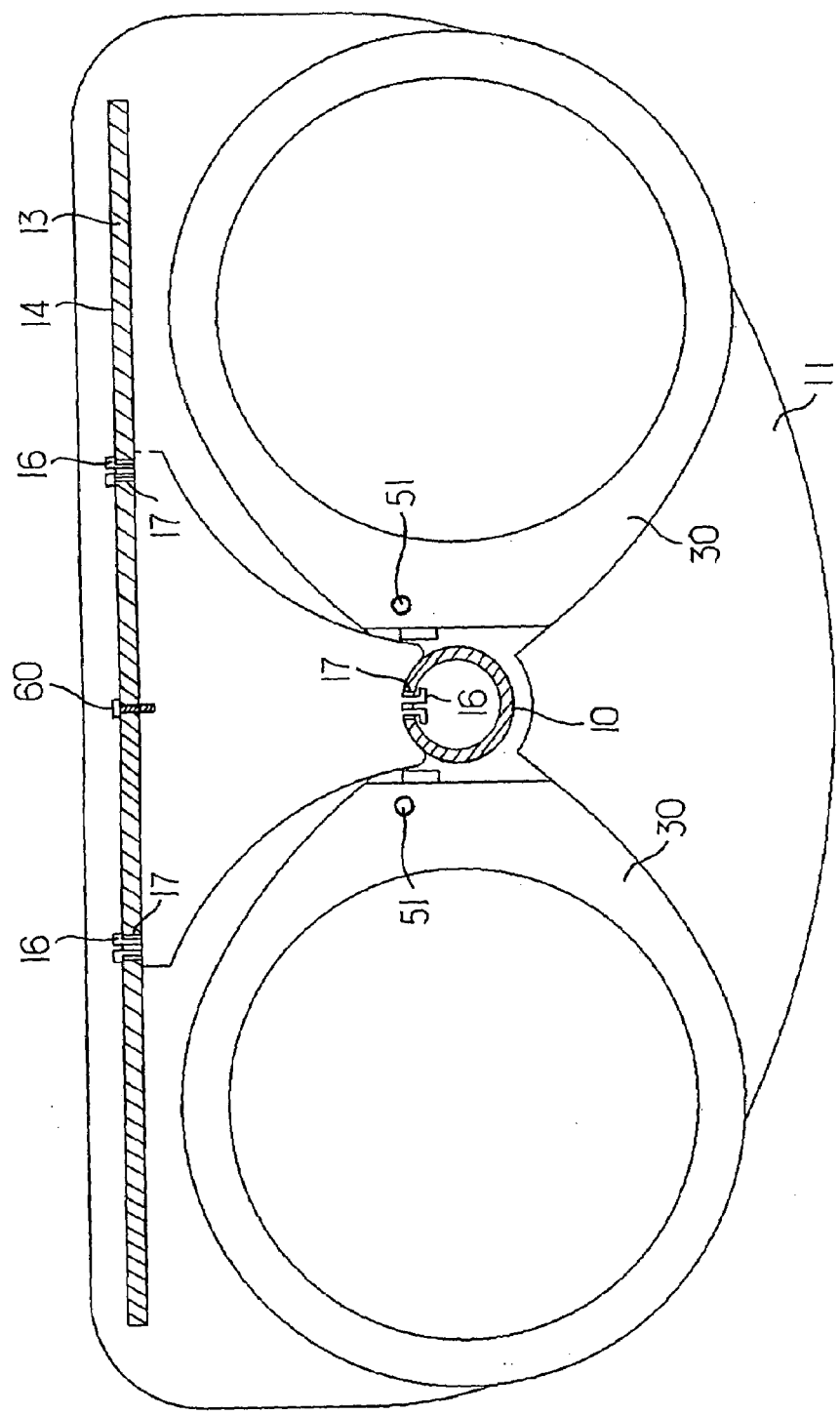
FIG. 3 is a cross-sectional diagram of the structure between the joint member, the support rod, and the back panel according to the present invention.
Figure 4:
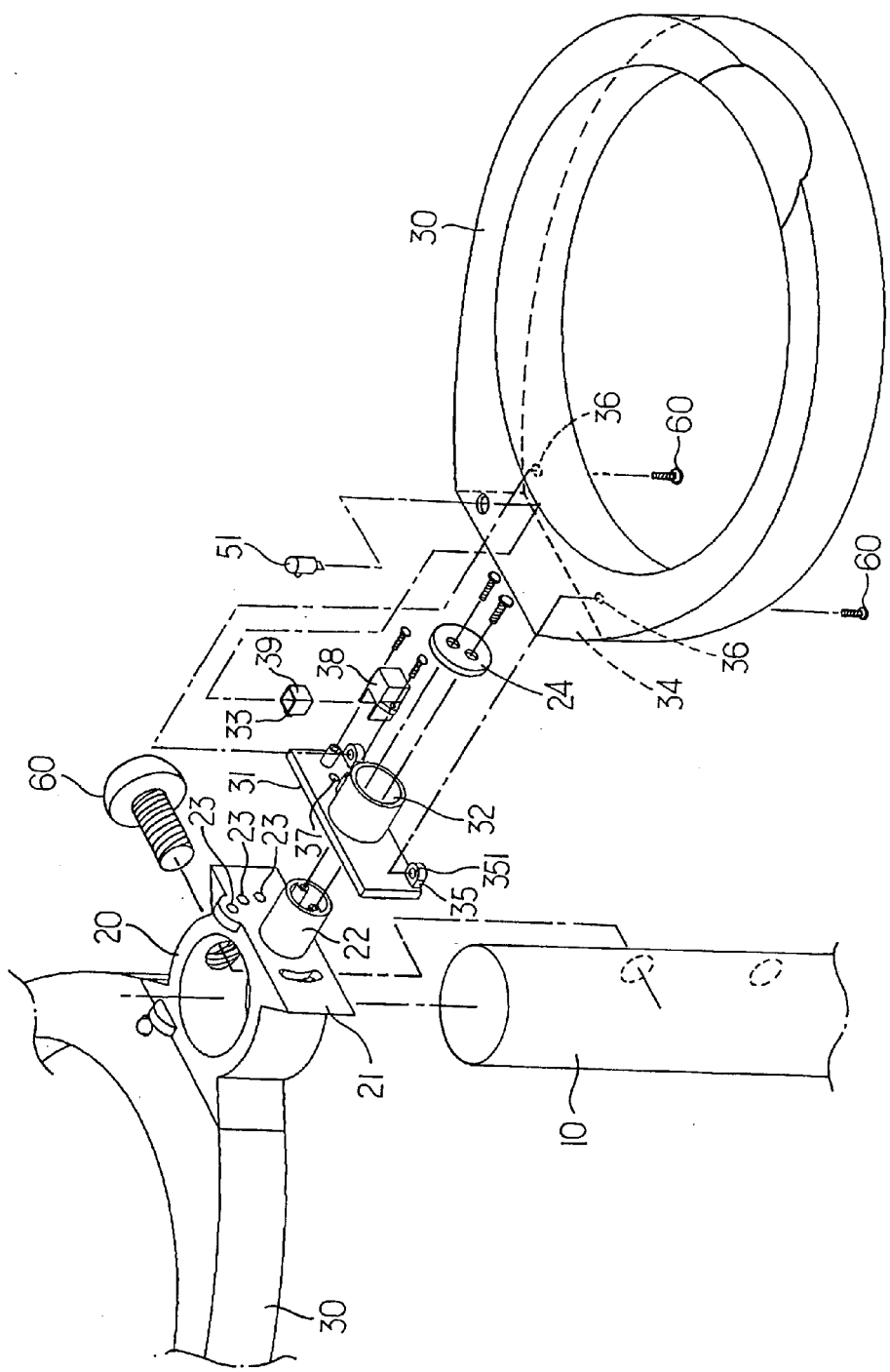
FIG. 4 is a perspective diagram of the disassembled parts of structure of the containing member and connecting member according to the present invention.

To make it easier for the examiner to understand the structure, and overall operation of this invention, the specification accompanied by the drawings is described as follows. Please refer to FIGS. 1 and 2. The pet food feeder of this invention comprises:

a support rod 10, being the main structure of the entire pet food feeder, and in this embodiment as shown in the figures, the support rod 10 at its bottom having a bottom plate 11, for placing the entire pet food feeder on the floor by the bottom plate 11, wherein the plate of the bottom plate 11 has a hole 12 for accommodating the insertion of the support rod 10, and the bottom plate at one side has a rear panel 13, and the bottom of the rear panel 13 is inserted into the insert groove 14 of the bottom plate 11, and the top of the support rod 10 has a connecting member 15 coupled with the rear panel 13; the connecting member 15 and support rod 10 are coupled with the rear panel 13 by the connection of a latch 16 and an insert hole 17 (as shown in FIG. 3) and the structure of the support rod 10 is secured by screws 60;

a connecting member 20, disposed on the support rod 10, as shown in figure of the embodiment, and the connecting member 20 being a ring structure disposed on the support rod 10, and fixing the connecting member 20 and the corresponding position of the support rod 10 by screws as shown in FIGS. 2 and 4, and the connecting member 20 at one side has a first connecting interface 21 vertically coupled to one side of the connecting member 20, and a pivotal axis 22 extended transversally on the first connecting surface 21, and at least two fixing holes 23 disposed on the first connecting surface 21, and each fixing hole being disposed equidistant apart from the axis of the pivotal axis;

a containing member 30, being a structure of a bin 40 for containing food, which could be a ring structure sheathing onto the food bin 40, and of course could be an integral structure with the food bin, and a second connecting surface 31 being vertically disposed on one side of the containing member 30, and an axial hole 32 disposed on the second connecting surface 31 for passing the corresponding pivotal axis 22, and a positioning latch 33 passing through the corresponding fixing hole 23, such that the connection of the pivotal axis 22 and the axial hole 32 making the second connecting surface 31 of the containing member 30 to be in contact with the first connecting surface 21 of the connecting member 20 to constitute the connection between the containing member 30 and the support rod 10 and insert the positioning latch 33 into one of the fixing holes 23.

Further, in the embodiment as shown in FIG. 4, an accommodating section 34 is disposed on one side of the containing member 30, and the second connecting surface 31 is a plate structure for covering an opening of the accommodating section 34, and the axial hole 32 is a tubular structure extended from one side of the accommodating section 34, and an end cover 24 disposed on the corresponding side of extending the accommodating section and coupling with the pivotal axis 22 to prevent the supporting member 30 and the connecting member 20 from falling apart. Further, a protruded ear 35 disposed on the corresponding side of the accommodating section 34 of the second connecting surface 31 is inserted into the accommodating section 34, and a lock hole is disposed on the protruded ear 351, and a hole 36 disposed on the supporting member 30 aligns with the lock hole 351 to facilitate locking the supporting member 30 by a screw 60 from the outside and securing the second connecting surface 31 and the supporting member 30.

Figure 5:
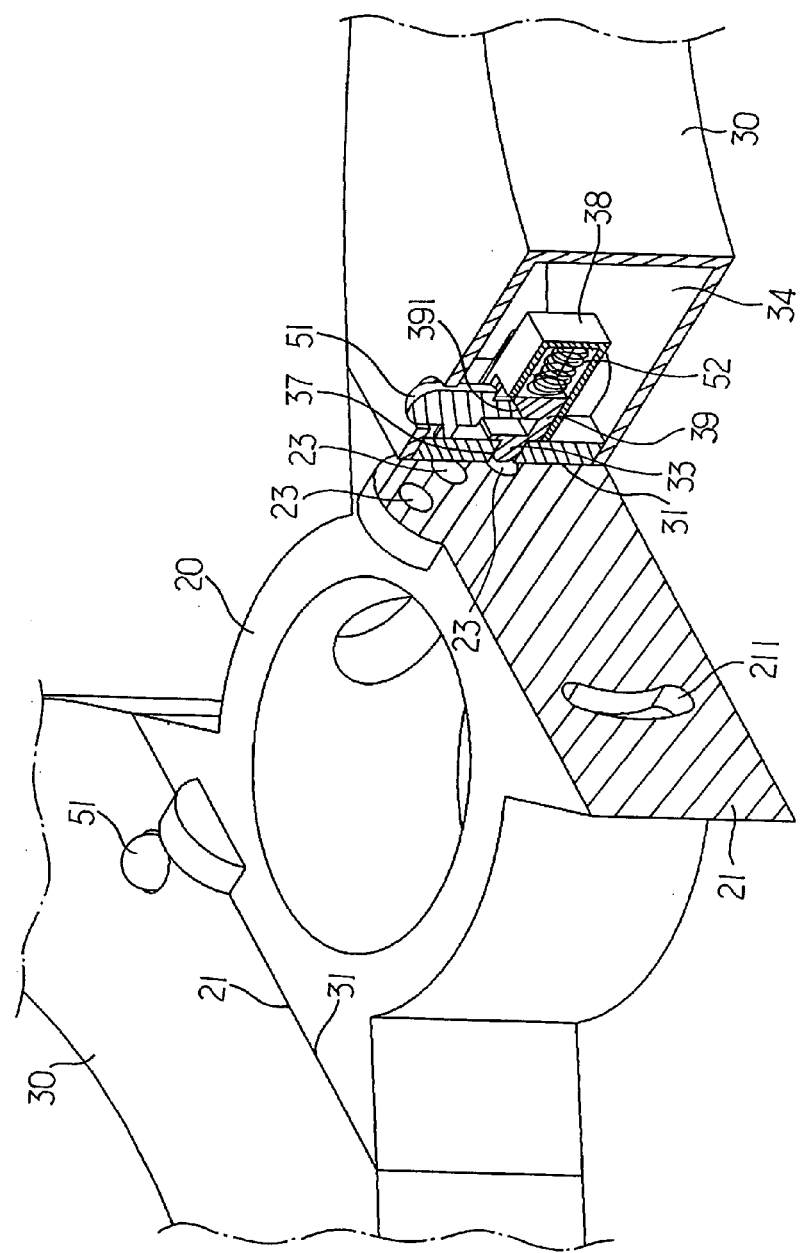
FIG. 5 is a cross-sectional diagram of the structure of the containing member according to the present invention.
Figure 6:
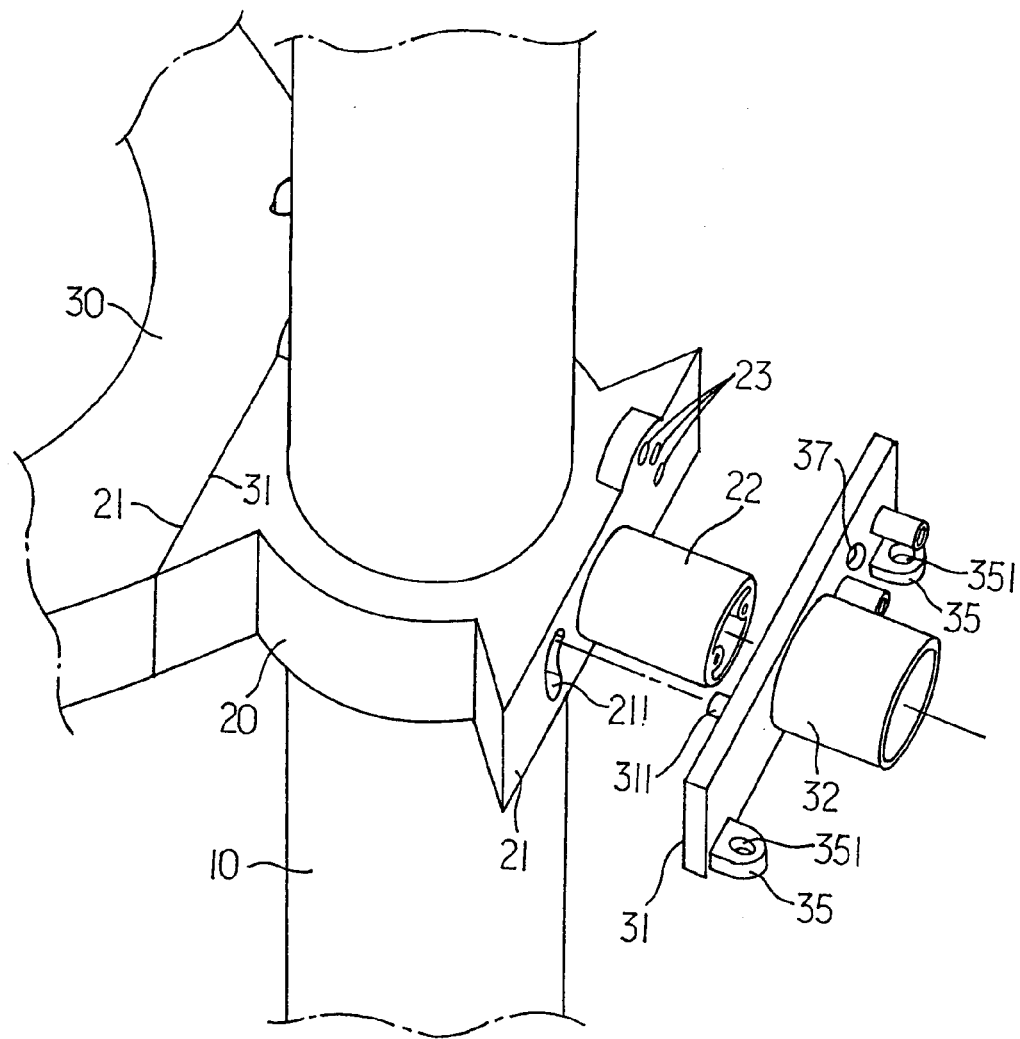
FIG. 6 is an illustrative diagram of the corresponsive position of the arc groove of the first connecting surface and the protrusion of the first connecting surface according to the present invention.

In FIGS. 4 and 5, the second connecting surface 31 further comprises a through hole 37 disposed at the corresponding position of the fixing hole 23 on the first connecting surface 21, a sliding base 38 disposed at the hole 36 on the side facing the accommodating section 34, a sliding member at its top having an aslant pushing surface 391, a press button disposed on the supporting member 30, and such press button 51 being in touch with the aslant pushing surface 391 of the sliding member 39, and the positioning latch 33 disposed on one side of the sliding member 39 facing the through hole 37, a spring 52 disposed between the sliding member 39 and the sliding base 38 such that the positioning latch 33 extended from the second connecting surface 31 to insert into the fixing hole 23 of the first connecting surface 21, and the press button 51 being protruded from the surface of the supporting member 30. Further, in FIG. 6, the first and second connecting surfaces 21, 31 respectively comprise an arc groove 211 and a protrusion 311 such that when the supporting member 30 rotates, the protrusion 311 simultaneously slides in the arc groove 211 to keep the supporting member 30 being rotated in a safety angle within the arc groove 211.

Figure 1:
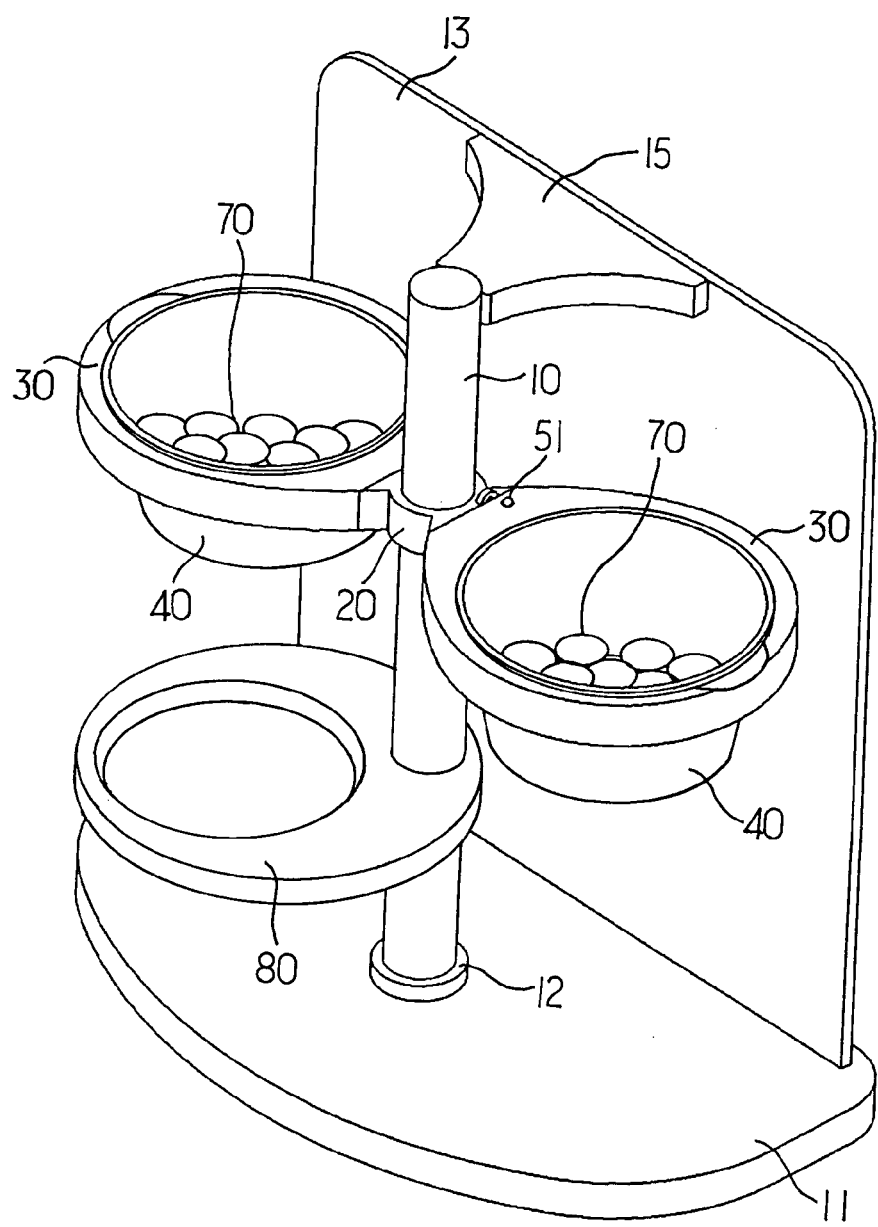
FIG. 1 is a perspective diagram of the external appearance of the pet feeder according to the present invention.
Figure 9:
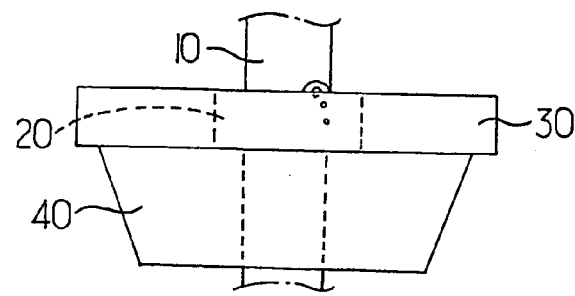
FIG. 9 is an illustrative diagram of the state when the angle of elevation of the containing member being rotated to the horizontal level according to the present invention.

When the food inside the food bin 40 of the pet food feeder is still in the position that is convenient for the pet to eat, the angle of elevation of the opening of the food bin 40 can be adjusted to the horizontal position by the supporting member 30 as shown in FIGS. 1 and 9. Please also refer to FIG. 7. The press button 51 pushes the sliding member 39 towards the through hole 37 by the spring 52 to protrude out to a predetermined height above the surface, and the spring 52 will push the positioning latch 33 into the fixing hole 23 on the first connecting surface 21 to securely fix the angle of the elevation of the opening of the food bin 40.

Figure 7:
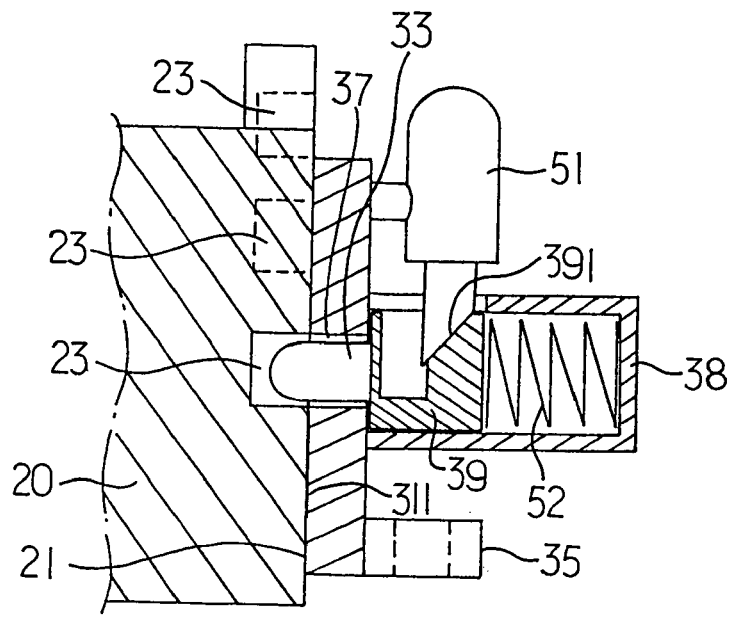
FIG. 7 is a cross-sectional diagram of the structure of the push button being protruded above the surface of the containing member of the present invention.
Figure 8:
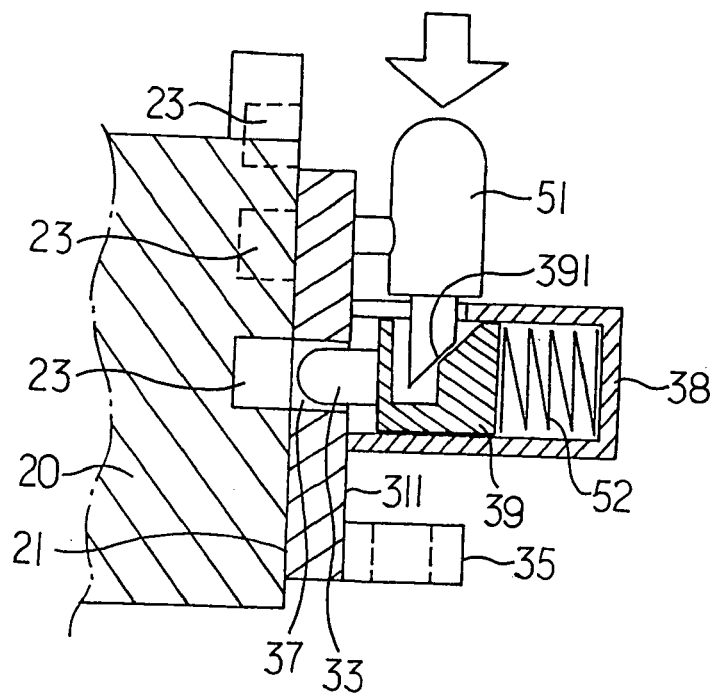
FIG. 8 is a cross-sectional diagram of the structure of the push button of the present invention.
Figure 10:
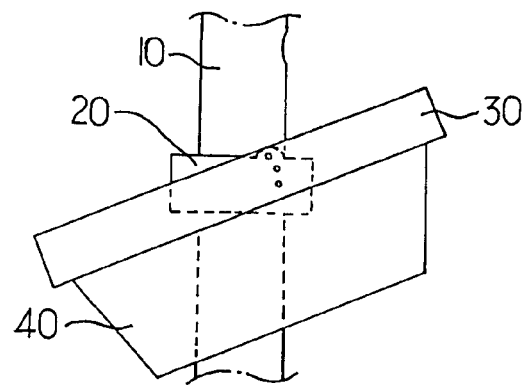
FIG. 10 is an illustrative diagram of the state when the angle of elevation of the containing member being rotated to the desired angle according to the present invention.
Figure 11:
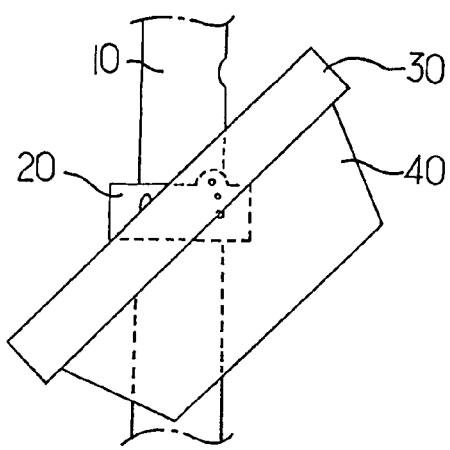
FIG. 11 is an illustrative diagram of the state when the angle of elevation of the containing member being rotated to another angle according to the present invention.
Figure 12:
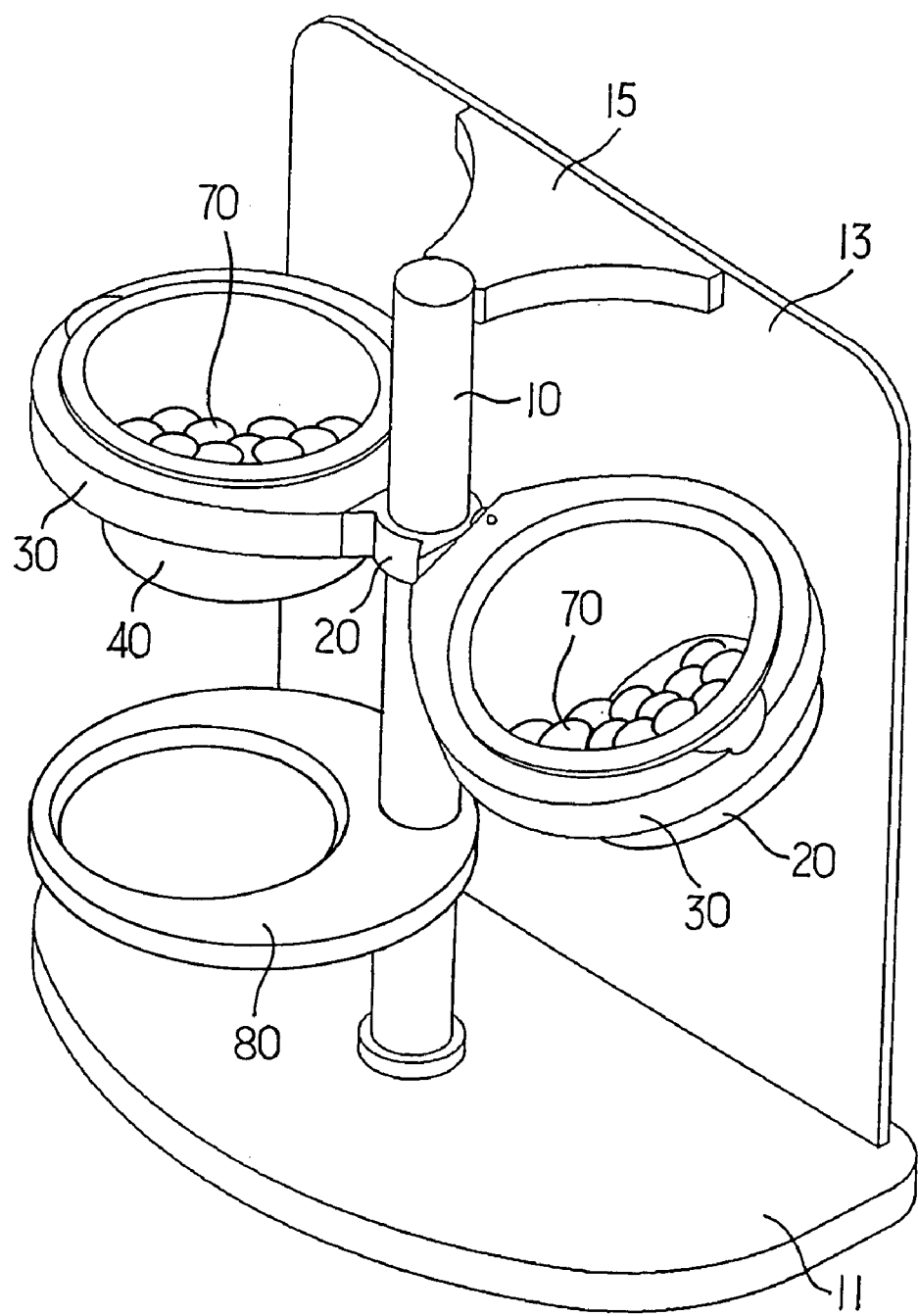
FIG. 12 is a perspective diagram of the external appearance of the pet feeder with the opening of the food bin being aslant according to the present invention.

When the food inside the food bin 40 is getting less and inconvenient for the pet to eat, then the user can press the press button 51, and the press button 51 will trigger the sliding member 39 to move towards the spring 52 as shown in FIG. 8, so that the positioning latch is withdrawn into the second connecting surface 31 and rotates the supporting member 30 into a desired direction to adjust the angle of elevation for the food bin 40 as shown in FIG. 10 or 11. Then, the press button 51 can be released, and after the supporting member 30 is rotated to a position such that the positioning latch 33 is aligned with the fixing hole 23, the positioning latch 33 can be inserted into the corresponding fixing hole 23 by the pushing of the spring (resuming the status as shown in FIG. 7) and thus accomplishing the purpose of adjusting the angle of elevation for the opening of the food bin 40 as shown in FIG. 12 and inclining the food bin 40 to an appropriate position such that the food in the food bin 40 is collected at the lowest point of the food bin 40 to facilitate the feeding of pets.

The whole pet food feeder further comprise a scale 80 at the bottom of the supporting member 30 to support the food bin 40, and the scale 80 is used to measure the weight of the food contained in the food bin 40, which makes the feeding more convenient, accurate, and easier. More particularly, the scale 80 can timely adjust the corresponding positions of the connecting member 20 and the support rod 10 to adjust the height of the food bin 40 in order to fit the height of the pet, and thus greatly enhancing the applicability of the pet food feeder.

The pet food feeder of this invention as described above provides a pet food feeder structure that facilitates the feeding of pets by timely adjusting the height and the angle of elevation of the food bin according to the height of the pet and the food in the food bin.

While the present invention has been described by the most practical and preferred embodiments, it is understood that this invention is not limited to the disclosed embodiments but is intended to cover various arrangements included within the spirit and scope of the broadest interpretations and equivalent arrangements.

What is claimed is:

1. A pet food feeder, comprising
   a support rod, being a main structure of the whole pet food feeder;
   a connecting member, disposed on said support rod and comprising a vertical first connecting surface on one side, and said first connecting surface transversely extending a pivotal axis, at least two fixing holes on said first connecting surface, and said fixing holes being disposed equidistant from the axis of said pivotal axis;

a supporting member, being a structure for holding a food bin, and at one side having a vertical second connecting surface, and comprising an axial hole for receiving said corresponding pivotal axis disposed on said second connecting surface, and a positioning latch for being inserted into a corresponding fixing hole to constitute the connection between the pivotal axis and axial hole such that the second connecting surface of the supporting member being in contact with the first connecting surface of said connecting member to constitute the connection between said supporting member and support rod, and said positioning latch being inserted into one of said fixing holes to fix the angle of elevation for the opening of said food bin, and said positioning latch being inserted into the other fixing hole to adjust the angle of elevation for the opening of said food bin, such that the food in said food bin being collected at the lowest point of the bottom of the food bin to facilitate the feeding of pets.

2. The pet food feeder of claim 1, wherein said support rod at its bottom comprises a bottom plate for placing the entire pet food feeder on a floor.

3. The pet food feeder of claim 1, wherein said support rod at its bottom comprises a bottom plate and said bottom plate has a rear panel on one side and an associating member disposed at the top of said support rod for coupling the rear panel to secure the support rod structure.

4. The pet food feeder of claim 1, wherein said connecting member is a ring structure being sheathed onto said support rod for securing the connecting member and support rod in a corresponding position by screws.

5. The pet food feeder of claim 1, wherein said supporting member at one side comprises an accommodating section, and said second connecting surface is a plate structure for covering an opening of said accommodating section, and said axial hole is a tubular structure being extended from one side of said accommodating section, and coupled with the pivotal axis by an end cover disposed on one end of the pivotal axis which is inserted into said accommodating section.

6. The pet food feeder of claim 5, wherein said second connecting surface at one side corresponding to said accommodating section comprises a protruded ear being extended into said accommodating section, and a lock hole being disposed on said protruded ear, and said supporting member comprises a hole being aligned with said lock hole to facilitate the connection of said supporting member from the outside and secure said second connecting surface with said supporting member.

7. The pet food feeder of claim 5, further comprising a through hole disposed on said second connecting surface at a position corresponding to said fixing holes on said first connection surface, a sliding base disposed on one side of said accommodating section facing said hole, a sliding member at its top having an aslant pushing surface disposed on said sliding base, a press button disposed on said supporting member such that said press button constitute a pressing on said aslant pushing surface of said sliding member, and said positioning latch being disposed on one side of said through hole facing said sliding member, and a spring disposed between said sliding member and said sliding base, and said positioning latch being protruded from said second connecting surface by said spring under normal conditions to push said sliding member towards said through hole, and said press button protruded above the surface of said supporting member; when said press button being pressed, said press button triggering said sliding member to move towards said spring such that said positioning latch being withdrawn into said second connecting surface and rotating said supporting member in a desired direction to adjust the angle of elevation for the opening of said food bin, and then said press button being released; when said supporting member being rotated to a position where said positioning latch being aligned to the predetermined fixing hole, the pushing of said spring aligning said positioning latch to insert into the corresponding fixing hole to accomplish the adjustment of the angle of elevation for the opening of said food bin.

8. The pet food feeder of claim 1, wherein said first and second connecting surfaces respectively comprise an arc groove and a protrusion for simultaneously rotating said supporting member and sliding said protrusion into said arc groove, thereby keeping said supporting member being rotated within a safety angle in said arc groove.

9. The pet food feeder of claim 1, wherein said supporting member is a ring structure being sheathed onto said food bin.

10. The pet food feeder of claim 1, wherein said supporting member is a structure integrally coupled with said food bin.

11. The pet food feeder of claim 1, wherein said supporting member is a ring structure being sheathed onto said food bin and comprises a scale at the bottom of said supporting member to support said food bin and measure the weight contained in said food bin.

* * * * *